(Model.)

J. STOFFER.
SAW FILING MACHINE.

No. 269,550. Patented Dec. 26, 1882.

Witnesses.
J. C. Risden
Saml. V. Essick

Inventor.
Jacob Stoffer

UNITED STATES PATENT OFFICE.

JACOB STOFFER, OF NORTH GEORGETOWN, OHIO.

SAW-FILING MACHINE.

SPECIFICATION forming part of Letters Patent No. 269,550, dated December 26, 1882.

Application filed February 20, 1882. (Model.)

*To all whom it may concern:*

Be it known that I, JACOB STOFFER, a citizen of the United States, residing at North Georgetown, in the county of Columbiana and State of Ohio, have invented certain new and useful Improvements in Saw-Filing Machines; and I do hereby declare that the following is a full, clear, and exact description of the invention, which will enable others skilled in the art to which it appertains to make and use the same.

The object of my invention is to provide a means for holding a saw firmly in place and filing each tooth exactly the same depth and bevel of all the other teeth of the saw, so as to make them uniform in height and shape, and at the same time to form a means for moving the saw along a regular distance according to the size of the teeth as each tooth is filed.

Figure 1:
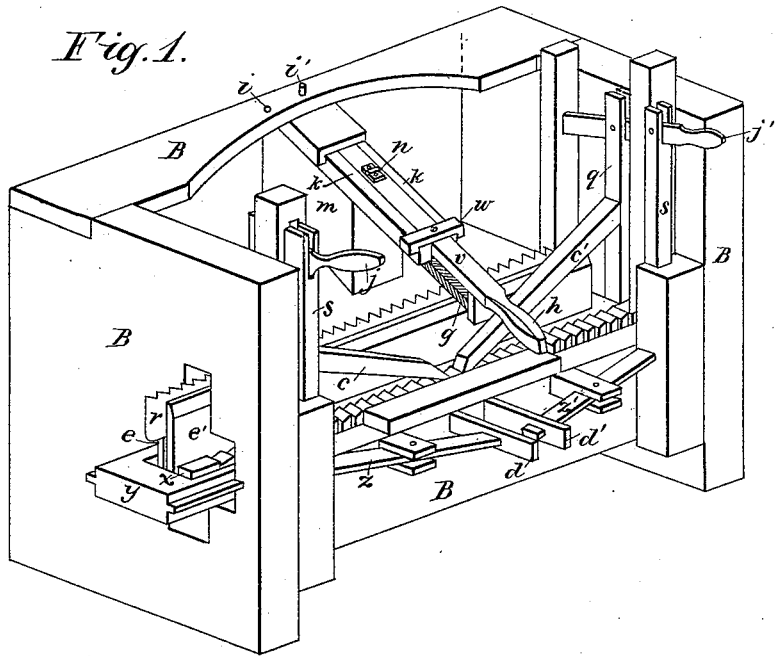
Figures 2, 3:
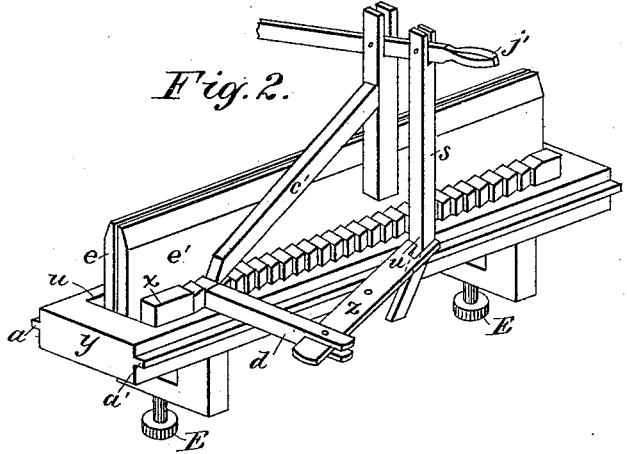

Referring to the accompanying drawings, Figure 1 is a perspective view of the invention, showing all its working parts arranged in order for operation. Fig. 2 is a view of the two upright parts $e$ $e'$ between which the saw is held. Fig. 3 is an inverted view of the parts $e$ $e'$, showing the cross-ties $o$ $p$.

Similar letters refer to similar parts throughout the several views.

B B B B constitute the frame-work of the machine.

$e$ $e'$ are two upright pieces, which are held together by the cross pieces or ties $o$ $p$, (shown in Fig. 3,) and which are held by frame $y$ by being placed in a mortise within the same. The said pieces, thus united, form a clamp for holding the saw.

$y$ is a sliding frame, the office of which is to hold the parts $e$ $e'$, which form the saw-clamp and the notched bar $x$. The said frame $y$ contains the ribs or flanges $a$ $a'$, which set in grooves in the main frame B, and also three mortises for holding the notched bar $x$ and the upright pieces $e$ $e'$. The central mortise is entirely through the said frame, and holds the said parts $e$ $e'$, and allows the said parts $e e'$ to rest upon the screws E E. The object of said screws E E is to form a delicate adjustment for elevating the saw when held in its clamp $e$ $e'$ to an exact height.

$c$ $c$ are pawls, the points of which drop into the notches of the bar $x$. The said bar $x$ is movable, and if the operator wishes the slide $y$ to move to the left, he places it in the position shown in Figs. 1 and 2, and then brings the pawl $c'$ and the detent $d^2$ in play by means of the handle $j'$ and parts $q$, $s$, and $z$. If he desires the said slide $y$ to move to the right, he reverses the bar $x$ and causes the pawl $c$ and detent $d$ to act upon said bar by means of the handle $j$ and its connections. If the operator wishes to move the saw in the reverse direction from the one in which it last moved without taking it out of the clamp, he reverses the frame $y$ with the uprights $e$ $e'$, and then places the notched bar $x$ in the other mortise or receptacle.

The manner of operating the pawls and detents may be thus described. Both combinations being operated in the same manner, a description of the one to the right, as shown also in Fig. 2, will be sufficient. When the handle $j'$ is raised the pawl $c'$ is drawn to the right, and is caused to drop in the notch next on the right to the one last acted on, and by the same motion of said handle the detent $d'$ is drawn back out of the way of the side notches of said bar. The said handle is then acted upon in a downward direction, by which operation the said pawl $c'$ is caused to move to the left, carrying with it the bar $x$ and all its connections, and when the said handle has moved a proper distance it may be stopped by the striking of the shoulder $u$ of the slide $s$ against the piece $z$, and when the same has reached its full destination said notched bar, with its connections, is held firmly in position by means of said pawl and detent, the one pressing in one direction and the other in the opposite direction.

$r$ is the saw in position between the upright pieces $e$ $e'$.

$m$ is the part of the file-holding device which connects the same with the frame B. The said connection is made by means of a pivot or screw firmly fastened in the under side of said piece, and passing through the portion of said frame immediately under the said parts. The object of said pivot is to allow the said part to swing, in order to adjust the file to suit the bevel of the teeth of said saw. When the pin $i'$ is in the hole in which it is shown in Fig. 1 the bevel of the teeth will be filed in one direction, and when it is removed and the said part m, with its connections, turned until the said pin will enter the hole i, the bevel of the saw will be filed in another direction.

g is the file, which is held in the slide v by means of projections which extend below said slide. The said slide is provided with a handle, h, and also with the cross-piece w, which is firmly fastened to said slide, and serves both as a guide for said slide and to stop it in its downward motion. The said cross-piece w is provided with a downward projection at each end, which fits closely to the outer edge of the pieces k k, between which the said slide works.

n is a hinge, by means of which a joint is formed at the point at which said hinge is shown, so as to allow the slide v, with the file, to be lifted in the backward motion of said file.

The operation of my invention may be described as follows: The handles j and j' are first raised to their highest point, which operation removes the pawls c c' and the detents d d' out of the notches of the bar x, and permits the removal of the frame y and its connections from their position in the frame B, and thus enables the operator to place the saw in its position between the uprights e e'. The notched bar is then taken from the mortise in which it has been used and placed in the mortise on the other side of the uprights e e' in such position that the movements of the frame y will be reversed, and the frame y is then replaced in its position in the main frame B, and the pawl and detent which the operator desires to bring into use are then acted upon by the use of the proper handle, j or j', and when the tooth which has been brought into position has been filed the next tooth is brought forward and held in place by the same operation, and thus the operation continues, each motion of the said handle moving the saw two teeth each time, so that the proper bevel will be preserved, and when one-half of the full number of notches have thus been completed the said frame y, with all its connections, including the saw, are turned end for end. The pin i is then removed from the hole in which it is last used and placed in the other hole, which operation changes the position of the file, so that it will make the proper bevel, and the notches which have been left by the previous operation are then filed as before, the operator moving the file back and forth in the usual manner until the cross-piece w strikes the parts k and will allow to file no deeper.

What I claim as my invention, and desire to secure by Letters Patent, is—

1. The file-holding slide v, with its file g, in combination with the upright pieces e e', pawls c c', detents d d', and notched bar x.

2. The combination of the pivoted slide-holding piece m, the hinged slide v, and the file g.

3. The combination of the slide v, the pivoted slide-holding piece m, the pawls c c', the detents d d', and the frame y, with its specified connections.

JACOB STOFFER.

Witnesses:
S. V. ESSICK.
JOSIAH RISDEN.